United States Patent [19]
Nishimura et al.

[11] Patent Number: 5,777,952
[45] Date of Patent: Jul. 7, 1998

[54] THIN BIAS MAGNET UNIT FOR MAGNETO-OPTICAL RECORDING DEVICE

[75] Inventors: Hajime Nishimura, Chigasaki; Atsushi Ichikawa, Odawara; Akio Yabe, Fujisawa; Yuji Yokoyama, Odawara, all of Japan

[73] Assignees: Hitahi, Ltd., Tokyo; Hitachi Computer Peripherals Co., Ltd., Kanagawa-ken, both of Japan

[21] Appl. No.: 678,267

[22] Filed: Jul. 11, 1996

[30] Foreign Application Priority Data

Jul. 12, 1995 [JP] Japan ................... 7-176263

[51] Int. Cl.⁶ ............................................. G11B 11/00
[52] U.S. Cl. ............... 369/13; 369/77.2; 369/75.2; 360/114
[58] Field of Search ................ 369/13, 75.2, 75.1, 369/77.2, 77.1, 78, 79; 360/114, 59

[56] References Cited

U.S. PATENT DOCUMENTS

| | | | |
|---|---|---|---|
| 5,202,861 | 4/1993 | Yoshida | 369/13 |
| 5,345,431 | 9/1994 | Olivar et al. | 369/13 |
| 5,537,370 | 7/1996 | Shigematsu et al. | 369/13 |
| 5,587,973 | 12/1996 | Kanazawa et al. | 369/13 |

FOREIGN PATENT DOCUMENTS

| | | |
|---|---|---|
| 2-126402 | 5/1990 | Japan . |
| 5-2792 | 1/1993 | Japan . |
| 5-307785 | 11/1993 | Japan . |
| 5290433 | 11/1993 | Japan . |
| 6-176424 | 6/1994 | Japan . |

*Primary Examiner*—Tan Dinh
*Attorney, Agent, or Firm*—Fay, Sharpe, Beall, Fagan, Minnich & McKee

[57] ABSTRACT

A bias magnet unit has a permanent magnet that applies a bias magnetic field to an optical spot on a magneto-optical disk. A driving coil rotates the magnet in order to change a polarity of the bias magnetic field. A sensor detects the intensity and polarity of the bias magnetic field to confirm the rotational position of the magnet after it has been rotated. A linkage structure that is connected between a magnet holder of the magnet unit and the housing has arms that drive the magnet unit between two positions, one in which the magneto-optical disk cartridge can be inserted into the device and another in which the disk is loaded onto the spindle motor for recording/playback. Overall, the components of the device cooperate structurally to provide a relatively thin device structure having low power consumption.

15 Claims, 7 Drawing Sheets

THIN BIAS MAGNET UNIT FOR MAGNETO-OPTICAL RECORDING DEVICE

FIELD OF THE INVENTION

This invention is related to a magneto-optical disk device, in which an optical cartridge can be loaded and unloaded, and especially to a magneto-optical disk which is thin and operates with low power consumption.

BACKGROUND OF THE INVENTION

A magneto-optical disk device has generally a spindle motor that rotates an optical disk at a predetermined speed, an optical head and a signal detecting optical system that forms an optical spot at a predetermined recording position on the optical disk for recording and play back of data on the optical disk. A circuit is provided for signal processing and controlling the device and a loading mechanism receives an inserted disk cartridge and transfers the optical disk therein into a position in which data is recorded or played back. The device also includes a bias magnet unit having a magnet that applies a magnetic field to the optical spot, a magnet supporter, and a magnetic sensor that detects a polarity of the bias magnetic field.

The spindle motor and the optical head are located well inside the device so that it is difficult for an operator to set the optical disk cartridge directly onto the spindle motor because of the device structure. Therefore, in the magneto-optical disk device, a cartridge holder in the loading mechanism is loaded inside horizontally and then descends vertically. This efficiently positions the cartridge in order to position a center of the optical disk onto the spindle motor.

In the magneto-optical disk device, the data is recorded or erased by focusing the optical spot and by applying the bias magnetic field vertically to the surface of the disk at the recording spot. The polarities of the applied magnetic field are reversed during recording or erasing.

The bias magnetic structure in the prior art uses either permanent magnet or an electromagnet. Japanese Laid Open Patent Publication Hei 5-2792, discloses using an electromagnet as the bias magnet and the polarity of the applied magnetic field is reversed by switching the directions of electric current flowing through a coil of the electromagnet. However, it is inconvenient to use an electromagnet as the bias magnetic field because the coil needs to at least 8 mm in thickness and this makes it difficult to design a thin device.

On the other hand, Japanese Laid Open Patent Publication Hei 6-176424, discloses using a permanent magnet as the bias magnet and a permanent magnet driving coil surrounds a cylindrical permanent magnet that is rotated by an electromagnetic interaction between a current through the driving coil and a magnetic field generated by the permanent magnet. Consequently the polarity of the magnetic field applied by the permanent magnet is reversed. The driving coil of this type is arranged vertically to the radial direction of the optical disk in order to generate a large driving torque at start and stop for rotating the bias magnet and to get a quick change of the bias magnetic polarities.

For the above types of devices, a magnetic sensor detects a rotational angle of the bias magnet. The output signal at a predetermined rotational angle triggers a change of the current of the driving coil, which stops the rotation of the bias magnet. The magnetic sensor is arranged in the direction of thickness of the bias magnet in order to detect the angle precisely.

In Japanese Laid Open Patent Publication Hei 6-176424, the bias magnet and the optical head are stored in a moving head. The moving head varies its location in a radial direction of the optical disk. The optical spot and the bias magnetic field are applied from the same side of the disk surface in order to minimize the thickness of the device. In such a structure, there are problems that the moving head becomes relatively heavy and it takes a long time for access.

Whether or not a permanent magnet or an electromagnet is used, the intensity of the magnetic field becomes weaker in accordance with the increase in distance of the bias magnet from the surface of the disk. Accordingly, it is necessary to arrange the bias magnet as close as possible to the optical disk during recording or playing back of the data. For attaining this objective, structure is used to return the bias magnet to the upper area or to the side face of the cartridge holder during the entry (loading) or exit (unloading) of the cartridge.

In Japanese Laid Open Patent Publication Hei 5-307785, a bias magnet is disclosed that is moved in advance inside to a position wherein the optical cartridge is transferred by a loading mechanism and wherein an optical disk is set into position with respect to the optical head. At the same time with the setting of the optical disk onto the spindle motor, the bias magnet advances along the optical disk to the position where it faces the optical head and a bias magnetic field is applied. There are problems with this design, however. Since the bias magnet is moved or retreated inside the setting position of the optical disk cartridge, it is necessary to reserve a space for the bias magnet in this position and to provide a mechanism to set the magnet. It also takes more time to transport the bias magnet back and forth.

In Japanese Laid Open Patent Publication Hei 2-126402, a bias magnet is arranged between a device cover that is positioned at the upper part of an optical disk cartridge, in the inserting position, and a cartridge holder so that the bias magnet does not interfere with the insertion of the optical disk cartridge. The bias magnetic field application structure brings the bias magnet closer to the optical disk when the cartridge is inserted and the optical disk is set to a spindle motor. By the vertical movement of the loading mechanism that transfers the optical disk cartridge, a leaf spring attached to the side face of the bias magnet is moved vertically and the bias magnet is brought closer to the optical disk with a leverage mechanism. However, the thickness of the bias magnet and the above up-and-down structure is approximately 10 mm. Therefore in the case of a 5 inch half height size magneto-optical disk device, a space between the cartridge holder and the components that are positioned thereupon would be only around 3 mm. There may be a need to arrange a circuit board above the cartridge holder and to prepare holes therein, which results in a difficulty of designing the circuit board.

SUMMARY OF THE INVENTION

The present invention is intended to provide a thin bias magnet structure that can apply a bias magnetic field in a magneto optical disk device and that uses a thin rotating permanent magnet with a thickness of approximately 2 mm for applying the bias magnetic field. Further it is intended to provide a thin linkage and movement structure that positions the bias magnet vertically between two positions, one in which the magneto-optical disk cartridge can be inserted into the device and another in which the disk is loaded onto the spindle motor for recording/playback and the magnet so that the magnet is positioned close to the optical disk with excellent height accuracy.

To attain the objects of the invention, the following engineering problems were considered.

When a boundary plane between the S and N poles of a rotating bias magnet is positioned in line with the main plane of a driving coil, the torque to rotate the magnet goes to zero. Consequently the driving coil can not make the magnet stop or start its rotating. (Here, because the device is designed to be thin, the magnet is shaped like a plate and it is magnetized vertically with respect to the plate's surface.) Although arranging the driving coil and the bias magnet simply in parallel to the optical disk makes the magneto-optical disk device thinner than prior devices, the rotating torque applied to the magnet for changing its orientation and consequently the polarity of the applied magnetic field reaches a dead point in which the torque is zero and the bias magnet cannot be rotated.

In consideration of a mechanical part which brings the bias magnet closer to the optical disk during recording or playing back of the data, in the prior art, the distance in which the bias magnet is moved to the optical disk is required to be similar to the height between a cartridge holder and the components placed thereupon. In the present invention, the these considerations were as follows.

During loading or unloading of the optical disk cartridge, a thickness of the structure that moves the bias magnet up and down should be equal to or less than a thickness of the bias magnet and the bias magnet should be stopped at a position that does not interfere with the loading or unloading of the cartridge.

Further, during recording or playing back of the data, the bias magnet should be placed closer to the optical disk and a certain space should be kept between the components above the cartridge holder and the bias magnet.

The first object of the present invention was to arrange each element of the bias magnet unit using the rotational permanent magnet, such as, the thin permanent magnet, the driving coil and a magnetic sensor, above the cartridge holder within a space similar to the thickness of the permanent magnet so that the driving coil could rotate the bias magnet securely and stably.

The second object of the invention was to keep a thickness of the structure that moves the bias magnet up and down, which has a function to move the bias magnet closer to the optical disk with high precision, similar to the thickness of the bias magnet during loading or unloading of the disk cartridge.

The first object was solved by attaching cylindrical shaft stubs to each end of a bias magnet having a thickness of about 2 mm, supporting the shafts with a magnet holder that has slider bearing surfaces for supporting the shafts in rotation, providing a space at its center for the magnet to rotate, and arranging a magnet rotation driving coil and a magnetic sensor that detects a rotational angle of the magnet and a stopped position of the magnet's rotation, within a region that is defined between a plane parallel to the optical disk which includes a point of the magnet closest to the disk and another plane parallel to the optical disk which includes a point of the magnet farthest from the disk. By attaining this objective, the thickness is minimized. Also, the limit of rotation of the magnet by a stopper is provided in order to prevent the magnet from reaching a position that is a dead spot in the rotating torque, i.e. a point at which the torque becomes zero.

A life of the magnet holder may be prolonged by alleviating any shock associated with the collision of the magnet with the stopper by decelerating the rotation. The rotation can be decelerated by changing the rotation driving current or switching directions of the current during the rotating movement of the magnet.

The second object was solved as follows. Concerning the structure that moves the bias magnet up and down, the magneto-optical disk device has a side cover that faces the side of the cartridge holder and that is fixed to the device base, loading mechanism moves the cartridge holder that holds the optical disk cartridge vertically or horizontally-and-vertically, to transfers the cartridge vertically or horizontally-and-vertically.

In the structure that moves the bias magnet up and down, there are arms, each of which has a central linear portion, and both ends of which are L shaped. The central linear portion is pivoted by bearings mounted on an upper surface of the cartridge holder, and one L shaped tip of the arm is engaged with a hole arranged on a side surface of the bias magnet and the other L shaped tip is engaged in a hole on the side cover. At least one of the hole on the side of the bias magnet or the hole of the side cover is formed to be a slot or a long hole. The L shaped portions are engaged with the slots or long holes. The angle between the L shaped portion and the upper surface of the cartridge holder is offset form being 90 degrees at the start, operation and end of the loading or unloading (if the angle is 90 degrees, i.e. the L shaped portion is perpendicular to the surface of the cartridge holder, the cartridge holder cannot move or descend). The slider bearing surfaces secure a smooth rotation of the arms and a stable up-and-down movement of the bias magnet.

The slots or holes on the upper surface of the cartridge holder and the side surface of the bias magnet are arranged so that distances between the holes of the cartridge holder are longer than distances between the holes of the bias magnet. A stopper arm that links the holes of the cartridge holder with the holes of the bias magnet can stop descending of the bias magnet with high precision. Further, stopper portions are mounted on the cartridge holder or the bias magnet so that ascending of the bias magnet can be stopped at a position wherein the lower surface of the bias magnet and the upper surface of the cartridge holder are nearly equal or level.

Using the above the above structure, the rotational angle of the magnet is limited by the stopper portions. As the main plane of the magnet driving coil does not come to be in parallel with the boundary plane between the S and N poles of the bias magnet, the rotating torque for the bias magnet is not decreased to zero. Therefore the structure prevents the bias magnet from stopping its rotation between the opposite polarity magnetic field applying positions.

Before the magnet is stopped in rotation by the stopper portion, the current through the driving coil is changed for a deceleration of the rotational speed. Thus, a shock of the collision is decreased and a damage of the magnet and the stopper portion is suppressed. Consequently the magnet and stopper can have a longer life.

An intensity of the bias magnetic field applied to the optical disk can be made constant by holding a magnet position where the bias magnet is stopped in rotation. The holding is attained by flowing an electric current through the driving coil in the direction that makes the bias magnet continuously engage the stopper portion. An output of the magnetic sensor that is arranged near the side face of the bias magnet can be monitored to detect the polarity and intensity of the bias magnetic field applied to the optical disk to confirm proper positioning of the magnet after rotating it.

The structure that moves the bias magnet up and down is provided with a pair of L shaped portions. By a rotational movement in combination with a horizontal or a vertical movement of the L shaped arms of which the tips are engaged with the slots or long holes on the side cover, the bias magnet, with which the other tips of the L shaped arms are engaged, is transferred vertically. During the loading or unloading of the optical disk cartridge, the bias magnet is retreated into the space between the cartridge holder and the components that are positioned on the cartridge holder. During recording or playing back of the data, the bias magnet is brought closer to the optical disk. Since the end portions of the arms of structure that moves the bias magnet up and down, which are engaged with the slots or long holes arranged on the side cover, and the upper surface of the cartridge holder are always kept at an acute angle, the tips of the L shaped portions do not touch the side surfaces of the holes at a right angle. That is to say, the tips are not locked and do not stop ascending or descending the cartridge holder.

Also, preferably the vertical transfer distance of the bias magnet is limited by stopper arms that engage the slots in the cartridge holder and the bias magnet. Further, the stopper arms preferably have L shaped arms at their ends. The bias magnet does not touch the optical disk surface as a result of the stopper arms. Also, since the ascent of the bias magnet is limited by the stoppers mounted on the cartridge holder or the bias magnet, the bias magnet does not touch the components that are positioned above the cartridge holder.

DETAILED DESCRIPTION OF THE PREFERRED EMBODIMENTS

As set forth herein, the magneto-optical disk device of the invention is disclosed as having an optical disk disposed or horizontally. It is intended that the use of the words "horizontal", "vertical", "ascend", and "descend" and other words expressing relative positioning of the components of the disk device are to be given their normal meaning, that is a meaning consistent with the device being positioned horizontally on a work surface, for example. Of course, the device is intended to be operational in any orientation consistent with the use of the device in a computer, for example. Further, since it is intended that an operator will insert an optical disk cartridge into the disk device, the side facing the operator is disclosed as the outer side, meaning the external side and the other internal side is disclosed as being the "inner side".

Figure 1:
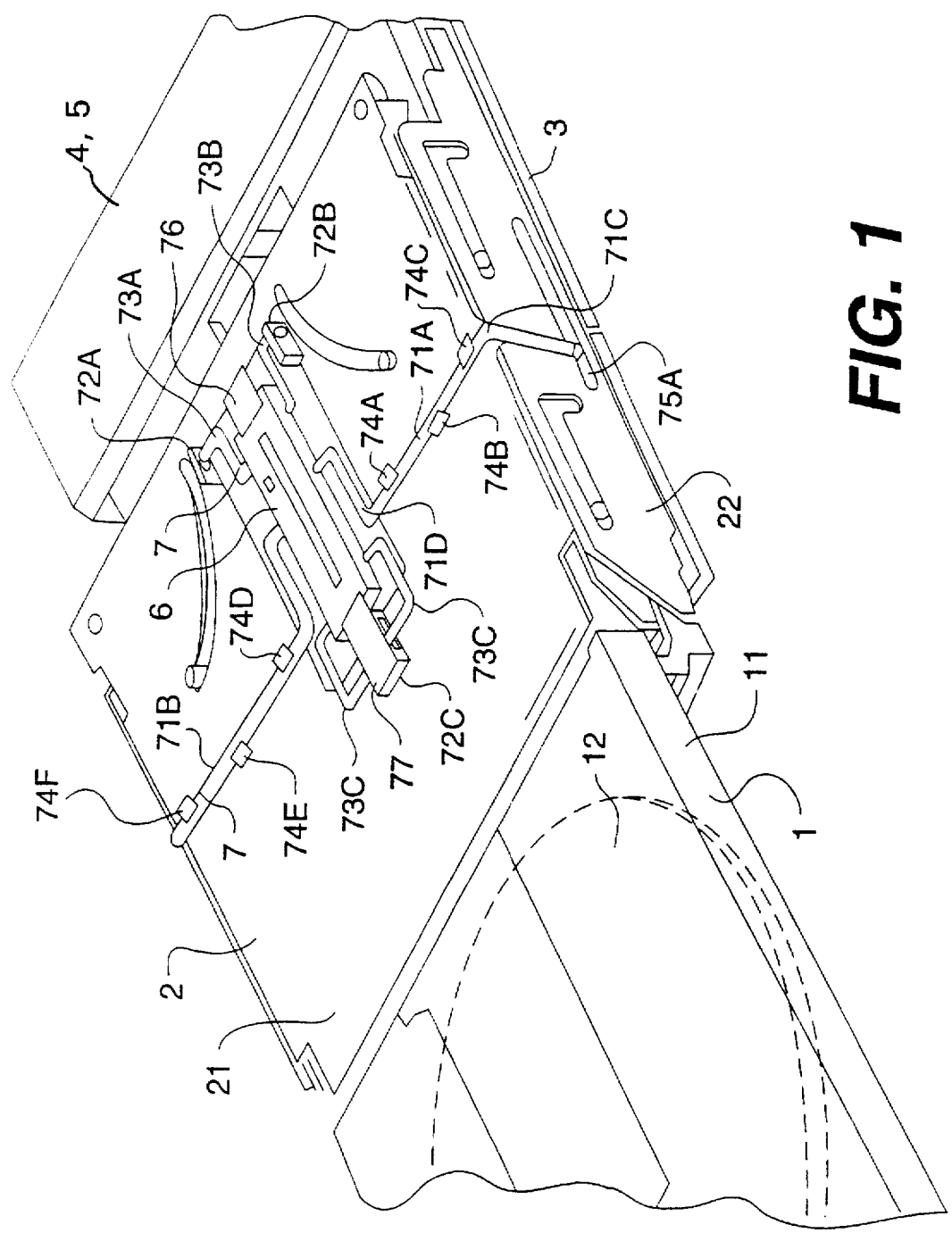
FIG. 1 is a perspective view of an embodiment of the magneto-optical disk device of the present invention.

FIG. 1 is a perspective view of the magneto-optical disk device of the present invention, according to a preferred embodiment. The magneto-optical disk device includes a unit mechanism or housing 3 on which a spindle motor and an optical head (not shown) are mounted. On a fixed portion 4 of the disk device, a semiconductor laser is intended to be mounted, along with the optical components normally associated with the laser, as well as a signal detection system and so forth (not shown). The fixed portion 4 also includes a circuit portion 5 that provides the signal processing function necessary for the operation of the device, such as the signal detection processing circuit, the signal processing circuit and the drive controller for the mechanisms of the disk device, etc.

A loading mechanism 2 is used for guiding the insertion of the magneto-optical disk cartridge 1 into the disk device. A bias magnet portion 6 applies a bias magnetic field to the optical disk 12 located within the cartridge 1 and a structure 7, to be explained in greater detail hereinafter, moves the bias magnet 6 up and down or vertically with respect to the magnetic disk.

The optical disk cartridge 1 is inserted by an operator from a front side of the device, and is first transferred to the inner side of the device by the loading mechanism 2. The loading mechanism 2 horizontally guides the disk cartridge with a cartridge holder 21 and then vertically downwardly loads the cartridge into the use position. In the use position, the optical disk 12 is supported by a spindle motor and rotated at a predetermined speed. Laser light emitted from a semiconductor laser passes through an optical head and is formed as an optical spot on a recording part of the disk 12. Reflected light from the optical disk goes through the optical head and is processed by a signal detection in process system that is part of the circuit portion 5, not shown in detail. As a result, data is able to be recorded and played back on the disk.

Figure 2:
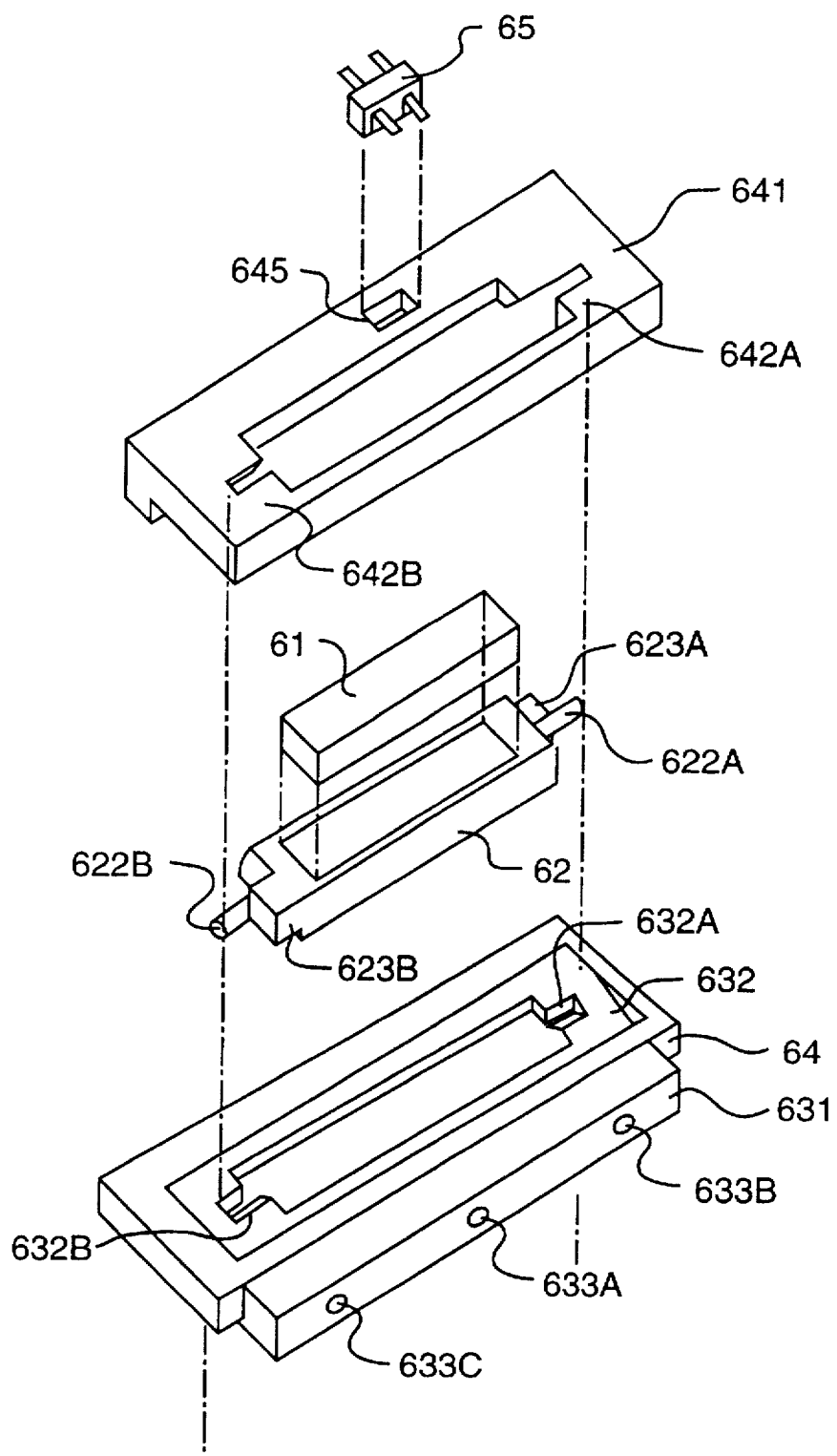
FIG. 2 is an oblique exploded view of the bias magnet.

FIG. 2 shows the details of the bias magnet 6 in an exploded view. The bias magnet unit includes a magnet 61, which is a permanent magnet preferably having a rectangular cross section that is about 2 mm in thickness and about 2 mm in width, and having an overall length of about 35 mm. The length of permanent magnet 61 is preferably about 5 mm longer than the difference between a maximum and a minimum radius of a recording area on the optical disk. Magnet 61 has opposite poles on its planar surfaces wherein one surface is an S pole and the other surface is an N pole. Accordingly, the permanent magnet is magnetized in the direction of its thickness to provide these opposite poles.

Magnet 61 is embedded in a center portion of a cap 62. The cap has end shafts 622A and 622B that are received in semicircular grooves 632A and 632B of a magnet holder 632 to permit rotation of the magnet 61 and cap 62 together. Preferably, the end shafts of cap 62 have a smooth circular outer dimension that is about 1 mm in diameter. The thickness of cap 62 is approximately the same as that of the thickness of magnet 61 so that smooth rotation of these components together is possible. Also, end shafts 622A, 622B are preferably coated with a material that permits smooth rotation of the end shafts.

Cap 62 also has stop 623A and 623B for stopping the rotational movement of the cap 62 to permit a predetermined angular rotation of the cap. The stoppers are arranged symmetrically about the rotational axis of the cap 62. A detailed disclosure of stopper 623A and 623B is set forth hereinafter with respect to FIGS. 6 and 7.

Magnet 61 is supported for rotational movement about the shaft end 622A, 622B by magnet holders 631, 632 and 641. Magnet holders 631 and 641 have a flat shape that is longer than magnet 61 in width and in length. The semicircle groove portions 632A, 632B formed in magnet holder 632 are complemented by upper semicircular grooves 642A, 642B formed in magnet holder 641. Together the semicircle portions respectively support shaft end 622A, 622B in rotation as bearing surfaces for the shaft ends.

Magnet holders 631 and 641 sandwich the cap 62 to support rotational movement of the cap therebetween. Preferably, each of the magnet holders 631 and 641 is one half of the thickness of the permanent magnet, i.e. each of the magnet holders is approximately 1 mm in thickness. As a result, when the magnet holder 631 and 641 are assembled together they have a similar thickness of that with cap 62.

Figure 3:
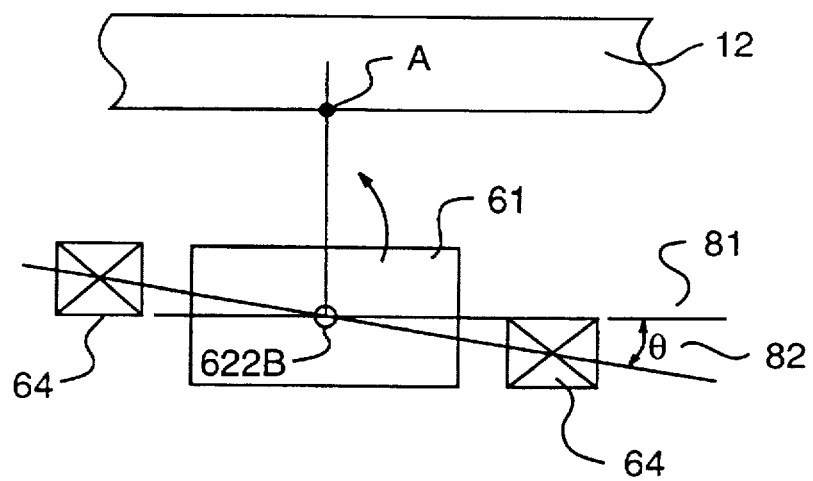
FIG. 3 is a cross sectional view showing the relative positions of the optical disk, the bias magnet and the driving coil during recording or playing back of the data on the optical disk.
Figure 4:
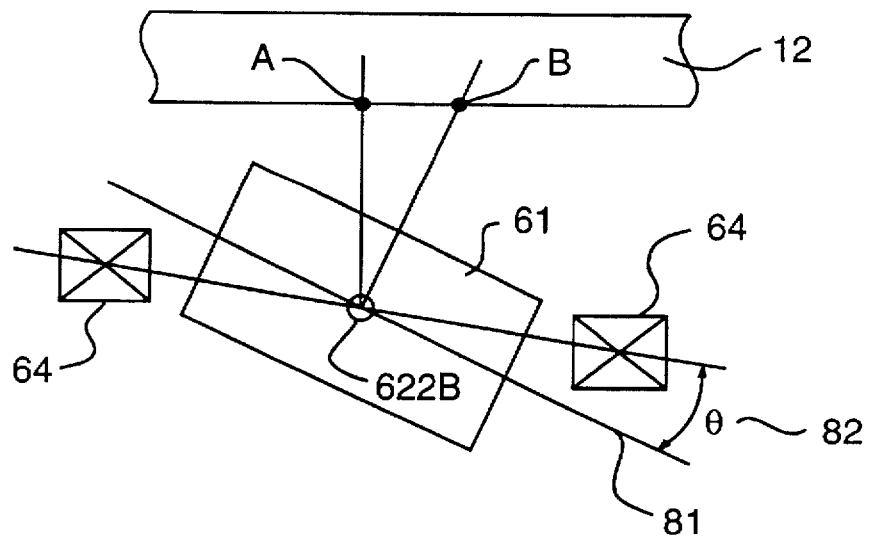
FIG. 4 is a cross sectional view showing the relative positions of the optical disk, the bias magnet and the driving coil during erasing of the data on the optical disk.

Cap 62 and magnet 61 rotate to provide the polarity change in the magnetic field that is applied to the disk 12. For rotating cap 62 and consequently magnet 61, a driving coil 64 is provided as shown in FIG. 2, and as schematically shown in FIGS. 3 and 4. As shown, driving coil 64 is angularly offset from being parallel to the surfaces of magnet 61. Coil 64 is shown as being fixed to magnet holders 631 and 632, and at one side of magnet holder 631, coils 633A–633C are provided, in which are received the ends or tips of arms 71A, 73B and 73C, respectively, as shown in FIG. 1. On the opposite side of the magnet holder 631, three similarly positioned holes (not shown) are provided in which are received the tops or ends of arms 71B, 73A and 73D. The arms of the magnet positioning structure are described in greater detail with reference to FIGS. 8–10.

As shown in FIG. 2, a magnet sensor 65 that detects the polarity of the applied magnetic field and the rotational angle of the magnet 61 from the intensity of the magnetic field is mounted in a socket 645 provided in magnet holder 641. The sensor is mounted on a small, thin circuit board that is not shown in the drawings.

The cap 62 and bias magnet 61 rotate by the interaction between the electric current flowing through the driving coil 64 and the magnetic field generated by magnet 61. The polarity reversing of the magnetic field applied to the disk is attained by rotating the cap 62. The cap 62 rotates from an initial position shown in FIG. 3, for example, at 0° to about 140° in the counterclockwise direction until reaching the position shown in FIG. 4.

FIGS. 3 and 4 show the relative positions of the disk 12, driving coil 64 and bias magnet 61, schematically. During loading or unloading of the optical disk cartridge 1 and during data recording, the magnet 61 is in the position shown in FIG. 3. Stoppers 623A and 623B, shown in FIG. 2, for example, are arranged so that the boundary plane 81 between the S and N poles of the magnet 61 is nearly in parallel to the optical disk when the magnet 61 is in the FIG. 3 position. A main plane that includes the center or mid portion of the driving coil 64 is angularly offset with respect to boundary plane 81 by an angle θ, which is preferably about 20°.

In FIG. 4, magnet 61 is shown in the position rotated about 140° counterclockwise from the position shown in FIG. 3 for erasing data on disk 12. Stoppers 623A and 623B on cap 62 engage stoppers 632A, 632B and 642A and 642B to limit the rotational movement of the cap 62. Cap 62 is prevented from rotating more than about 140° so that the boundary plane 81 does not end up being substantially in line with the mid line passing through the coil 64, in which case there would be a very limited amount of rotating torque generated upon excitation of the coil 64. In other words, the rotation of cap 62 is limited to prevent the cap from reaching a neutral position in which rotation in either direction would be made difficult merely by driving the cap with the coil 64.

Figure 6:
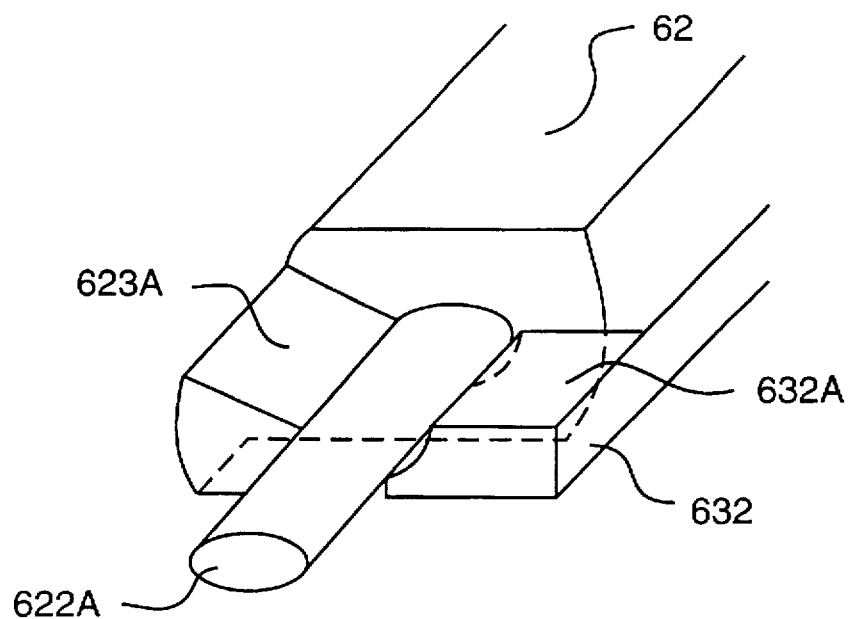
FIG. 6 is a partial perspective view showing the relative positions of the magnet and the stoppers during recording of the data on the optical disk.
Figure 7:
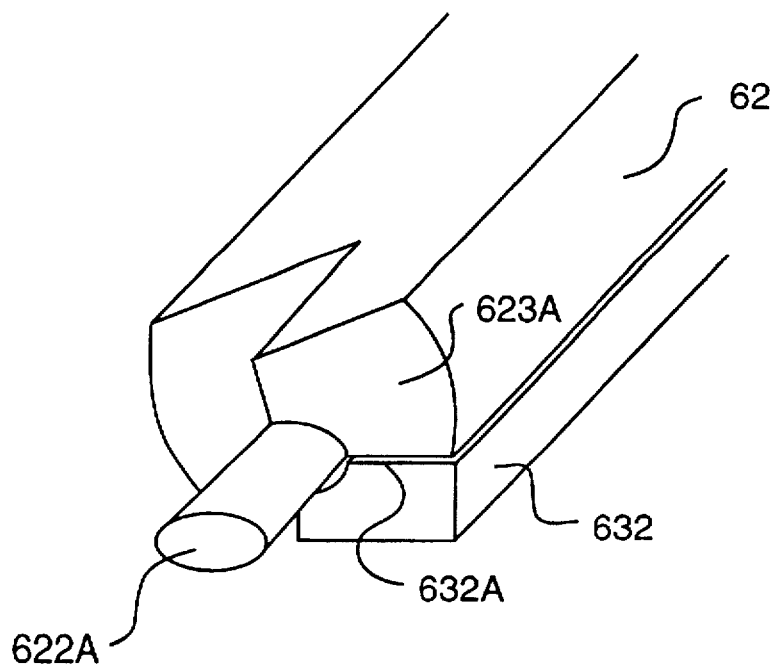
FIG. 7 is a partial perspective view showing the relative positions of the magnet and the stoppers during erasing of the data on the optical disk.

FIGS. 6 and 7 show the details of the relation between the stoppers and the magnet holder 632 by reference to one side of magnet cap 62. In particular, a stopper 623A of cap 62 is shown in FIG. 6 to be in the position schematically represented in FIG. 3. After rotation of about 140°, clockwise as shown in the transition between FIGS. 6 and 7, the stopper 623A engages the above surface 632A of magnet holder 632.

Figure 5:
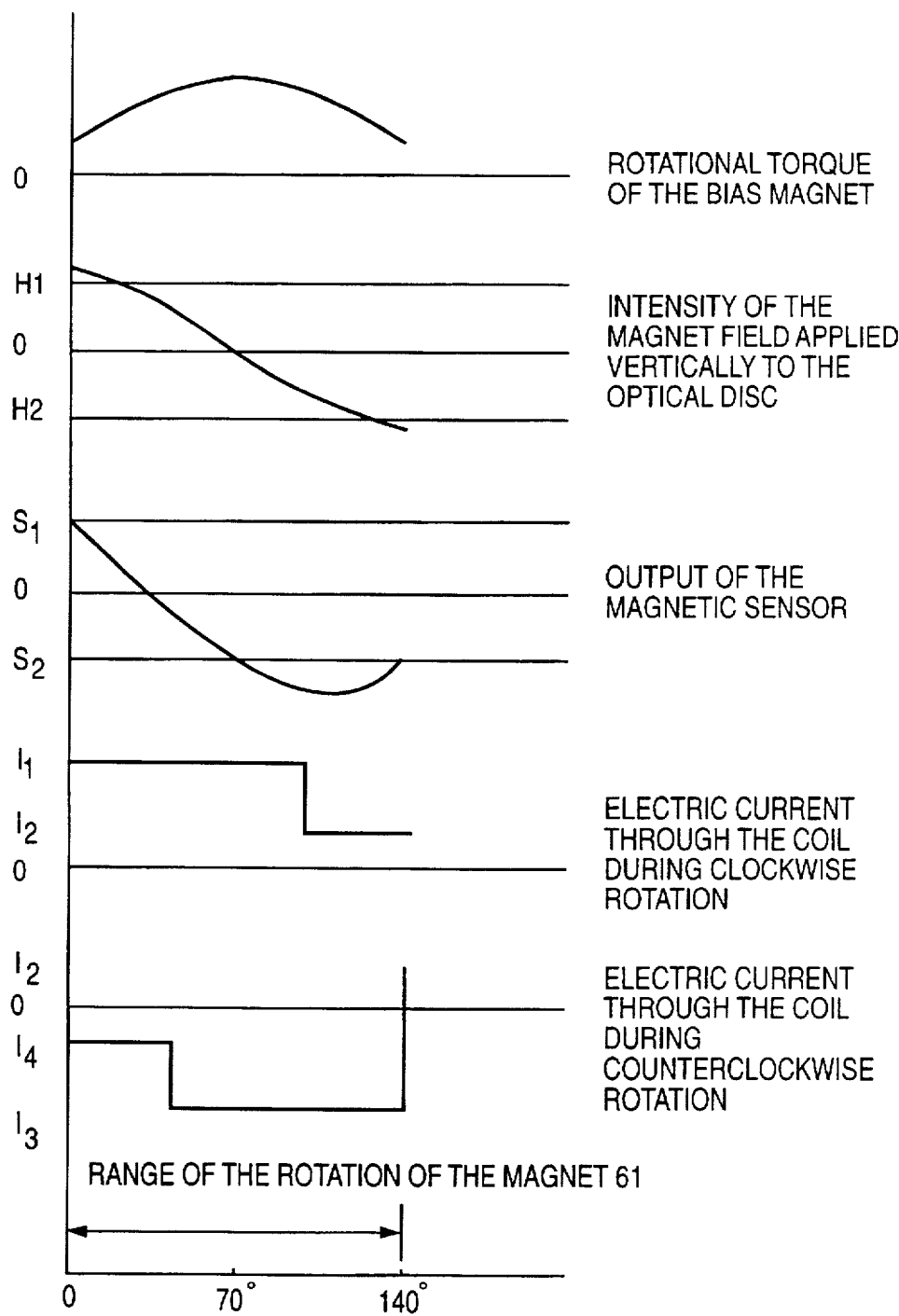
FIG. 5 is a multi-wave form graph showing relations between the rotational angle of the bias magnet and various other parameters.

FIG. 5 is a multiwaveform graph showing the values of various variables in relation to the degree of angular rotation of the magnet 61 in the transition between the positions of magnet 61 shown in FIGS. 3 and 4. These variables include the rotational torque of the bias magnet, the intensity of the magnetic field applied vertically to the optical disk, the output of the magnetic sensor 65, the electric current flowing through the coil during clockwise rotation and the electric current flowing through the coil during counterclockwise rotation of the magnet 61.

A current I1 is added to the driving coil 64 when the magnet starts to rotate, as shown in FIG. 5. Then the rotation of the cap 62 and magnet 61 is accelerated. During the acceleration, the current is reduced to I2, as shown, or reversed in its direction temporarily in order to decelerate the rotational speed and to alleviate the shock of the engagement between the stoppers. Reversing the direction of the current is an effective method to decrease the shock. After the magnet stops rotating, a minimum current level I2 is maintained to keep the magnet in its position with the stopper 623A and 623B engaging the surfaces 632A and 632B and 642A and 642B, respectively.

When the magnet is rotated in the reverse direction, a current I3 is generated in driving coil 64 and the magnet starts to rotate in the reverse direction. During acceleration in reverse, the current is reduced to I4, as shown or the direction of the current is reversed temporarily. After the magnet stops rotating, current level I4 is maintained in coil 64 to keep the magnet 61 in the position shown in FIG. 3.

FIG. 5 also shows the output of the sensor 65. When the magnet stops at either of the positions shown to be at 0° or 140°, the output of the sensor reaches the values S1 or S2, respectively. Therefore, the magnetic sensor 65 detects whether or not the magnet has stopped at one of the predetermined angular positions or not by monitoring the output of the sensor. If the output is within a predetermined range around the normal values, Si or S2, a stop position is determined to be confirmed.

Figure 9:
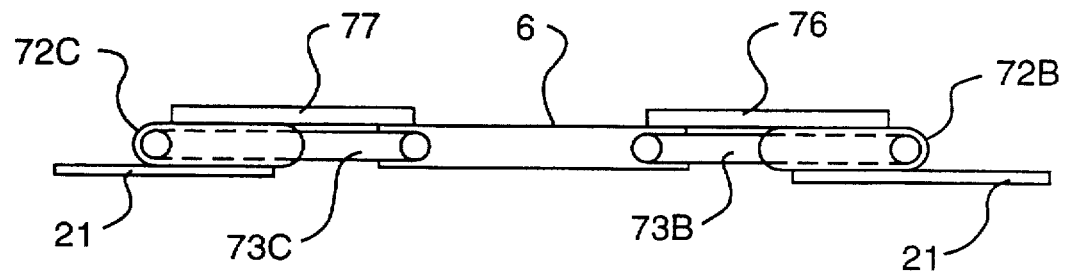
FIG. 9 is a partial elevational view of the disk device before the loading or after the unloading of the optical disk cartridge.

FIG. 9 shows that the lower surface of the bias magnet 6 is at nearly the same height as the upper surface of the cartridge holder 21. The bias magnet 6 is arranged above the cartridge holder and a venting hole is arranged at the upper surface of the cartridge holder for the up and down movement of the bias magnet 6. During loading and unloading of the optical disk cartridge 11, the boundary plane 81 of magnet 61 is nearly in parallel to the optical disk 12.

As shown in FIGS. 3 and 4, and as discussed above, the magnet 61 rotates approximately 140° so that its surface is not parallel with the optical disk 12 when in the erase position shown in FIG. 4. Accordingly, an optical spot A, which is along a line perpendicular to plane 81, directly above magnet 61, as shown in FIG. 3, is not subjected to the same magnetic field of opposite polarity when the magnet 61 is shifted to the position shown in FIG. 4. The reason for this is that the surface of magnet 61 is shown in FIG. 4. In other words, for a point "A", the intensity of the bias magnetic field applied vertically to the optical disk during erase is smaller than the intensity of a magnetic field applied during recording (FIG. 3). Therefore, an adjustment is made before assembly to shift the point on the magnetic disk that is to be recorded on or played back from and erased, depending upon the position of magnet 61. Such a shifted point "B" is shown in FIG. 4, for example. The position of point "B" is determined by insuring that the intensity of the magnetic field applied to the point A in FIG. 3 is the same as that applied to the point B in FIG. 4, however of opposite polarity. The optical spot is shifted prior to or in the process of assembly of the device so that the intensity of the vertical component of the magnetic field at the optical spot during erasing becomes substantially equal to or similar to that of the intensity of the vertical component of the magnetic field during recording.

A linkage structure 7 moves by its magnet 6 up and down, and is explained as follows with respect to FIG. 1. In particular, linkage structure 7 includes arms 71A and 71B, which are arranged oppositely of one another on each side of magnet 6 and supported, respectively, by bearing 74A, 74B, 74C and 74D, 74E and 74F. The bearings, which are mounted on the cartridge holder 21 permits smooth rotational movement of the arms. At each end of arms 71A, 71B are L shaped portions. In FIG. 1 the L shaped portions 71C and 71D are shown for arms 71A, and the arm 71B is arranged symmetrically with respect to arms 71A. A right angle bend is provided at the terminal portion of L shaped arm portion 71D and the top of the arm 71A is received with a hole 633A shown in FIG. 2 of magnet holder 631. A similar arrangement is provided for arm 71B on the other side of the magnet 6. At the other end portion of arm 71A, the tip of the arm of L shaped art portion 71C, the return bend or right angle bend enables the end or top of arm 71A to be received within an elongated slot 75A. Although the arrangement for arm 71A is shown in detail is the perspective view of FIG. 1, it is understood that arm 71B has a similar arrangement, including the provision of an elongated slot opposite to slot 75A that is formed in the side cover 22.

As shown in FIG. 2, magnet holder 631 also has holes 633B and 633C which receive, respectively, the ends of arms 73A, 73B and 73C. The opposite ends of each of these arms are respectively received in elongated slots 72A, 72B and 72C. During descent of the magnet 6, the end portions distal from magnet 6 of arms 72A–72C travel in respective slots 72A–C until the respective ends of these slots are engaged by the arms and the magnet can descend no further.

According to the arrangement of arms of linkage structure 7, the linkage does not occupy a great amount of space in the vertical direction on the cartridge holder 21. Further, the bias magnet 6 moves vertically smoothly. It is clear from FIG. 1 that the length of the slots 72A–72C is longer than the distance between the holes 633B and 633C of magnet holder 631.

To stop the ascent of magnet 6 in the upward direction, protruding thin plates 76 and 77 are arranged opposite one another on the upper part of slots 72C and between slots 72A and 72B. These plates are positioned so that the lower surface of the bias magnet 61 equals the level of the upper surface of the cartridge holder 21, as shown in FIG. 9.

Figure 8:
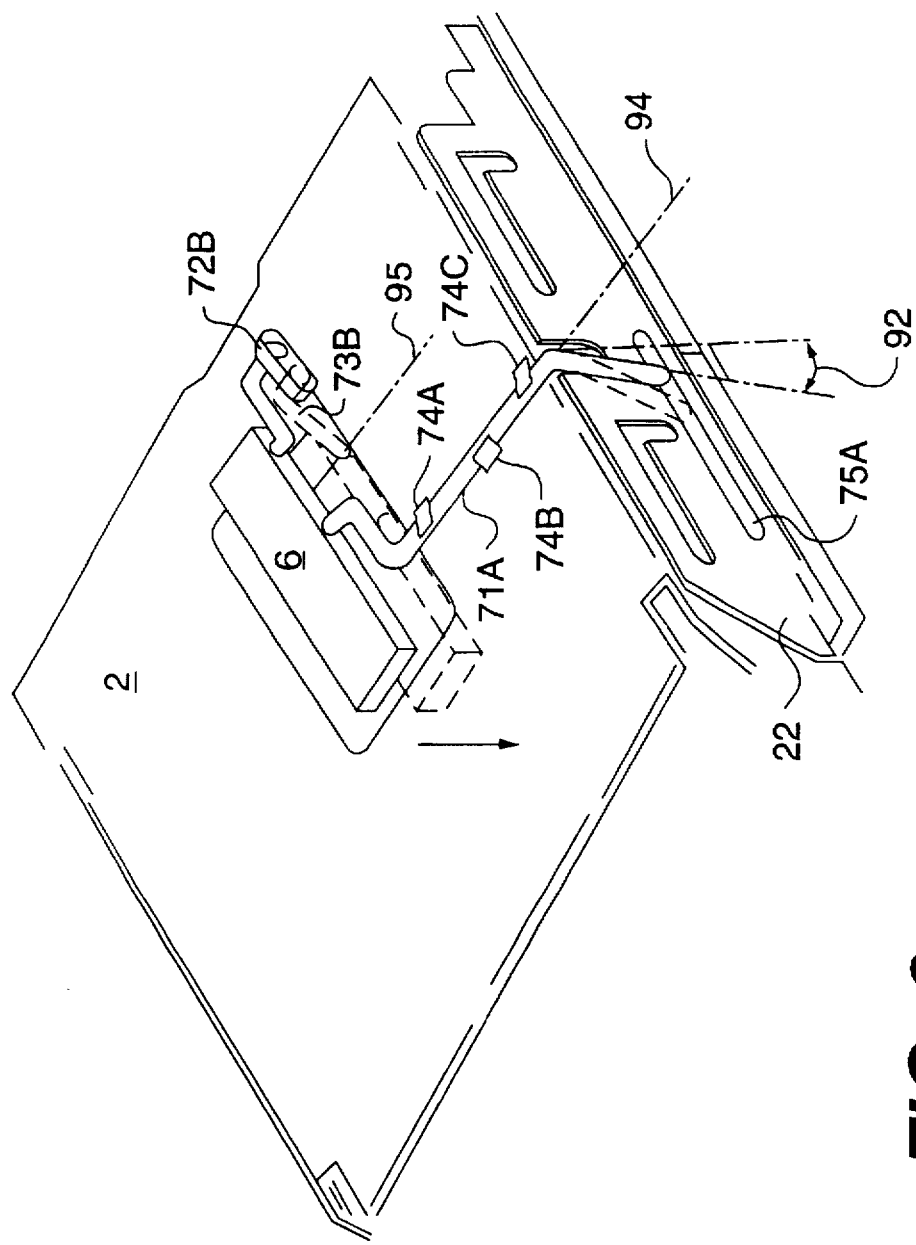
FIG. 8 is a partial perspective view useful for explaining the operation of the up-and-down movement of the bias magnet.

Movement of the bias magnet by the linkage structure 7 is shown with respect to FIG. 8. FIG. 8 is a simplified or partial perspective view that discloses only the arms 71A, the stopper arm 73B and the slot portion 72B. When an operator inserts an optical disk cartridge 11 into the magneto-optical disk device, the cartridge 11 is held by the cartridge holder 21 and a loading motor and corresponding mechanism (not shown) transfers the cartridge holder 21 horizontally into the interior of the device. After confirming an end of the horizontal transfer operation of the cartridge holder 21 by a sensor (not shown) the cartridge holder 21 descends. During the descent, the tip of the arm 71A, which is engaged in the slot 75A of the side cover 22, is driven by a vertical upward force applied through slot 75A. This causes rotation of arm 71A around an axis of rotation 94, which is a shaft of the arm for an angle of rotation 92 measured with respect to a perpendicular or vertical line that is perpendicular to the surface of cartridge holder 21. The tip of the arm 71 is moved horizontally along slot 75A by the upwardly generated force, which makes arm 71A rotate thereby increasing angle 92. Consequently, clockwise rotation, as viewed in FIG. 8, is produced resulting in magnet 6 being driven in descent. Accordingly, FIG. 8 shows the down position in dashed lines and the up position in solid lines.

According to the descent of the bias magnet 6, the stopper arm 73B rotates around an axis of rotation 95, which is a pivoting center of arm 73B. The tip of the stopper arm 73B, which is engaged with the slot 72B moves horizontally along the slot 72B to the end of the slot closest to the center of the device as the arm rotates. The end portion of the slot 72B stops the horizontal movement of the tip of the stopper arm 73B and consequently rotational movement of the stopper arm 73B so that the descent of the bias magnet 6 is stopped. It is understood that this action is also achieved through the arm and slot combinations of arms 73A and 73C and the respective slot 72A and 72C, although these arms and slots are not shown in FIG. 8.

Figure 10:
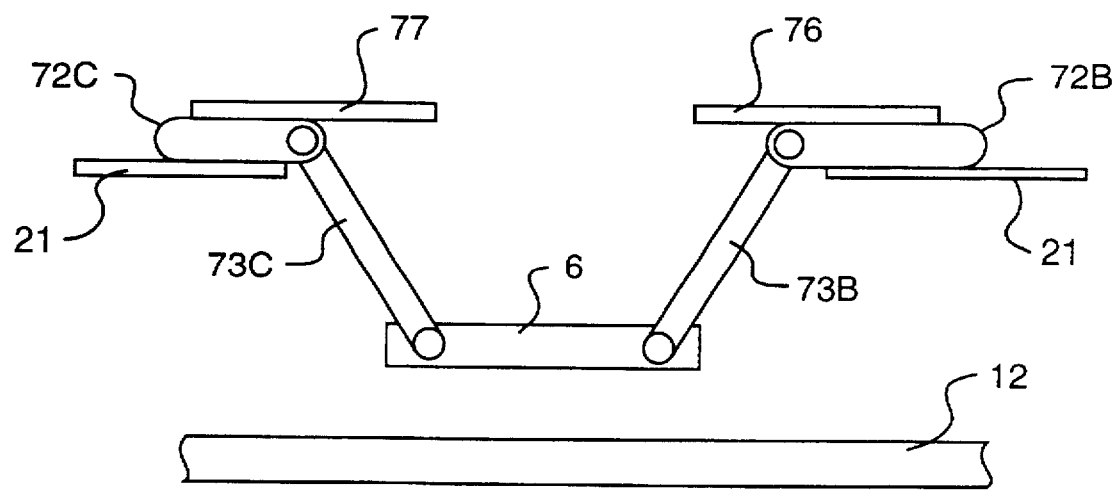
FIG. 10 is a partial elevational view of the disk device during recording or playing back the data on the optical disk.

FIG. 10 is a partial elevational view showing the relative positions of the bias magnet 6 (61), the cartridge holder 21, the optical disk 12, the stopper arms 73B and 73C. The arm 71A and connection point to magnet 6 through hole 633A formed in magnet holder 631 is not shown in FIG. 10.

The unloading operation is performed similarly to the loading operation, except that the cartridge holder 21 moves vertically upwardly or ascends. A vertical downward force pushes the top of the arms 71A, which is engaged in slot 75A. The tip of the arm 71A moves along the slot 75A horizontally to the inner side of the device. Therefore, the arm 71A rotates counterclockwise around the axis of rotation 94 and the bias magnet 6 ascends. The thin plates 76 and 77 are arranged to stop the ascent of the bias magnet in the position, as shown in FIG. 9. This leaves the lower surface of the bias magnet 61 to be approximately equal with the upper surface of the cartridge holder 21, thereby providing clearance for the removal of magneto-optical disk cartridge 11.

The linkage structure that drives the bias magnet up and down, according to the present invention, is thin enough to be arranged between the device cover and the cartridge holder. When an operator inserts the optical disk cartridge into the magneto-optical disk device, a thin bias magnet arranged between the device cover and the cartridge holder descends to a position adjacent or near to the recording spot of the optical disk by the aforementioned structure providing the up and down movement. When the operator rejects the optical disk cartridge, the bias magnet is repositioned into the space between the device cover and the cartridge holder, thus allowing the cartridge to be removed.

The driving coil, the magnetic sensor and the magnetic holder, as well as the structure providing the up and down movement of the magnet can be arranged, according to a preferred embodiment of the invention, within a space of a thickness of about 2 mm. The profile of these components is shown in FIG. 9 to be very thin. Accordingly, the height of the magneto-optical disk device can be decreased, which decreases the overall size of the device, thereby making the magneto-optical disk device more compact.

Further, the electric current that flows through the driving coil is low when the coil rotates the bias magnet or when it is stopped. Still further, since the structure providing the up and down movement of the bias magnet is mainly comprised of the linkage structure 7 that does not require special motors or gears to transfer the bias magnet, the device of the present invention can be assembled easily and function efficiently with small power consumption.

We claim:

1. A magneto-optical disk device having a housing including a base and a side cover fixed to said base, a cartridge holder for holding and transferring an optical disk cartridge, a spindle motor that rotates an optical disk in said optical disk cartridge, and an optical head that projects an optical spot onto a recording or playing back portion of an optical disk, comprising:

a loading mechanism that transfers said optical disk cartridge, when held by said cartridge holder, between an entry/exit position and a playing position by transferring said cartridge vertically;

a bias magnet unit that includes a permanent magnet that applies a bias magnetic field to said projected optical spot, a driving coil that rotates said permanent magnet in order to switch a polarity of said bias magnetic field as applied to said projected optical spot, and a sensor to detect said polarity of said bias magnetic field;

said driving coil of said magnet and said sensor are arranged within a thickness of said magnet with respect to a thickness direction of said optical disk; and a stopper for limiting a rotational angle through which said magnet rotates so that a boundary plane between an S pole and an N pole of said magnet is not in parallel with a plane of said optical disk in a stopped position of said magnet.

2. A magneto-optical disk device having a housing including a base and a side cover fixed to said base, a cartridge holder for holding and transferring an optical disk cartridge, a spindle motor that rotates an optical disk in said optical disk cartridge, and an optical head that projects an optical spot onto a recording or playing back portion of an optical disk, comprising:

a loading mechanism that transfers said optical disk cartridge, when held by said cartridge holder, between an entry/exit position and a playing position by transferring said cartridge vertically;

a bias magnet unit that includes a permanent magnet that applies a bias magnetic field to said projected optical spot, a driving coil that rotates said permanent magnet in order to switch a polarity of said bias magnetic field as applied to said projected optical spot, and a sensor to detect said polarity of said bias magnetic field;

a stopper for limiting a rotational angle through which said magnet rotates so that a boundary place between an S pole and an N pole of said magnet is not in parallel with a plane of said optical disk in a stopped position of said magnet;

a linkage structure for moving said magnet up and down including a pair of support arms, each having a central linear portion pivoted by bearings on an upper surface of said cartridge holder; and each said support arm further having first and second L-shaped portions at opposite end portions thereof, and a first tip at one end of said support arm adjacent said first L shaped portion that is engaged with a first hole provided on a side of said bias magnet unit and a second tip at the other end of said support arm adjacent said second L shaped member that is engaged with a first slot that is arranged on said side cover;

wherein, for each said support arm, movement of said second tip in said slot causes rotational movement in said central linear portion to move up and down said first tip by movement of said first L shaped portion that causes up and down movement of said bias magnet unit.

3. A magneto-optical disk device according to claim 2, further including:

stopper arms arranged on opposite sides of said support arms and second and third slots arranged on an upper surface of said cartridge holder, said stopper arms at one end thereof engaging second and third holes in sides of said magnet unit and engaging at the other end thereof said second and third slots;

wherein a distance between said second and third slots is longer than a distance between said second and third holes of said bias magnet unit, whereby a descent position of said magnet unit is limited by said stopper arms when said loading mechanism drives said cartridge holder vertically to said playing position.

4. A magneto-optical disk device according to claim 3, further including protruding stoppers on one of said cartridge holder and said bias magnet unit for stopping an ascent of said bias magnet unit at a position where a lower surface of said bias magnet unit is level with said upper surface of said cartridge holder.

5. A magneto-optical disk device according to claim 4, wherein said linkage structure has a thickness nearly equal to a thickness of said magnet unit during a loading/unloading position.

6. A magneto-optical disk device according to claim 1, wherein a plane that goes through said optical spot and crosses vertically said optical disk, does not correspond to a plane that goes through a rotational axis of said magnet and crosses vertically said optical disk, and said optical spot is shifted horizontally and appropriately so that an intensity of said bias magnetic field during erasing data, is approximately equal to an intensity of said bias magnetic field during recording of said data.

7. A magneto-optical disk device having a housing including a base and a side cover fixed to said base, a cartridge holder for holding and transferring an optical disk cartridge, a spindle motor that rotates an optical disk in said optical disk cartridge, and an optical head that projects an optical spot onto a recording or playing back portion of an optical disk, comprising:

a bias magnet for applying a magnetic field to said optical disk at said optical spot;

a stopper for limiting a rotational angle through which said magnet rotates so that a boundary place between an S Pole and an N Pole of said magnet is not in parallel with a plane of said optical disk in a stopped position of said magnet;

a linkage structure mounted on said cartridge holder in a space at a center of the cartridge holder that moves the bias magnet up and down;

said linkage structure including arms that rotate around an axis that are secured on said cartridge holder.

8. A disk device according to claim 7, further comprises:

a sensor in said linkage structure that detects a polarity and an intensity of said magnetic field.

9. A disk device according to claim 7, further comprises:

a side cover fixed to a base of said device and that faces a side of said cartridge holder.

10. A disk device having a housing including a base and a side cover fixed to said base, a cartridge holder for holding and transferring an optical disk cartridge, a spindle motor that rotates an optical disk in said optical disk cartridge, and an optical head that projects an optical spot onto a recording or playing back portion of an optical disk, comprising:

a permanent magnet that applies a magnetic field to a disk medium in said disk cartridge;

a stopper for limiting a rotational angle through which said magnet rotates so that a boundary place between an S Dole and an N pole of said magnet is not in parallel with a plane of said optical disk in a stopped position of said magnet;

a linkage structure mounted on said cartridge holder in a space at a center of the cartridge holder that moves the bias magnet up and down;

a driving coil in said linkage structure that rotates said permanent magnet in order to switch a polarity of said magnetic field; and said linkage structure including arms that rotate around an axis that are secured on said cartridge holder.

11. A disk device according to claim 10, further comprises:

a sensor in said linkage structure that detects a polarity and an intensity of said magnetic field.

12. A disk device according to claim 10, further comprises:

a side cover that is fixed to a base of said device and that faces a side of said cartridge holder.

13. A disk device having a housing including a base and a side cover fixed to said base, a cartridge holder for holding and transferring an optical disk cartridge, a spindle motor that rotates an optical disk in said optical disk cartridge, and an optical head that projects an optical spot onto a recording or playing back portion of an optical disk, comprising:

a permanent magnet that applies a magnetic field to a disk medium in said disk cartridge;

a stopper for limiting a rotational angle through which said magnet rotates so that a boundary place between an S pole and an N pole of said magnet is not in parallel with a plane of said optical disk in a stopped position of said magnet;

a linkage structure mounted on said cartridge holder in a space at a center of the cartridge holder that moves the bias magnet up and down;

a loading mechanism that transfers said disk cartridge horizontally and vertically from a loading position to a playing position together with said cartridge holder;

said linkage structure including arms that rotate according to said vertical transfer of said disk cartridge around axes that are secured on said cartridge holder.

14. A disk device according to claim 13, further comprises:

a sensor in said linkage structure that detects a polarity and an intensity of said magnetic field.

15. A disk device according to claim 13, further comprises:

a side cover that is fixed to a base of said device and that faces a side of said cartridge holder.

\* \* \* \* \*